(12) United States Patent
Boussemart et al.

(10) Patent No.: US 10,390,053 B2
(45) Date of Patent: Aug. 20, 2019

(54) DYNAMIC AND DISTRIBUTED MESHED NETWORK FOR IN-FLIGHT ENTERTAINMENT SYSTEMS

(71) Applicant: Systems and Software Enterprises, LLC, Brea, CA (US)

(72) Inventors: Vincent Boussemart, Brea, CA (US); Oliver Lucke, Brea, CA (US); Elisenda Temprado Garriga, Brea, CA (US)

(73) Assignee: Systems and Software Enterprises, LLC, Brea, CA (US)

( * ) Notice: Subject to any disclaimer, the term of this patent is extended or adjusted under 35 U.S.C. 154(b) by 0 days.

(21) Appl. No.: 15/896,826

(22) Filed: Feb. 14, 2018

(65) Prior Publication Data

US 2018/0234706 A1    Aug. 16, 2018

Related U.S. Application Data

(60) Provisional application No. 62/458,942, filed on Feb. 14, 2017.

(51) Int. Cl.
| | |
|---|---|
| *H04N 21/214* | (2011.01) |
| *H04L 12/28* | (2006.01) |
| *H04W 84/12* | (2009.01) |
| *H04H 60/80* | (2008.01) |
| *H04N 21/222* | (2011.01) |

(Continued)

(52) U.S. Cl.
CPC ..... *H04N 21/2146* (2013.01); *B64D 11/0015* (2013.01); *H04H 20/62* (2013.01); *H04H 60/80* (2013.01); *H04L 12/2881* (2013.01); *H04N 21/2223* (2013.01); *H04N 21/43637* (2013.01); *H04N 21/632* (2013.01); *H04W 4/08* (2013.01); *H04W 84/12* (2013.01); *H04H 20/71* (2013.01); *H04H 20/76* (2013.01); *H04L 67/06* (2013.01); *H04L 67/12* (2013.01); *H04W 4/80* (2018.02)

(58) Field of Classification Search
CPC ........... H04N 21/2146; H04N 21/2223; H04N 21/632; H04H 20/62
See application file for complete search history.

(56) References Cited

U.S. PATENT DOCUMENTS

| | | |
|---|---|---|
| 8,565,758 B2 | 10/2013 | Owyang et al. |
| 9,420,629 B2 | 8/2016 | Krug |

(Continued)

FOREIGN PATENT DOCUMENTS

| | | |
|---|---|---|
| JP | 2005535170 A | 11/2005 |
| JP | 200951258 A | 3/2009 |
| WO | 2004047373 A2 | 6/2004 |

*Primary Examiner* — Junior O Mendoza
(74) *Attorney, Agent, or Firm* — Umberg / Zipser LLP

(57) ABSTRACT

Systems and methods are described for distribution of content within a vehicle. A server having a first set of content stored within a memory can be communicatively coupled with one or more clients such as using a plurality of wireless access points. Each of the clients can have a processor, memory, and transceiver, such that it can communicate with the server and potentially its neighbors. Groups of the clients can be communicatively coupled, such as via a wired or wireless network, which permits the clients to communicate with one another to retrieve content, for example, rather than burden the server or the wireless access points.

19 Claims, 4 Drawing Sheets

(51) Int. Cl.

| | |
|---|---|
| *H04N 21/4363* | (2011.01) |
| *H04N 21/63* | (2011.01) |
| *H04H 20/62* | (2008.01) |
| *B64D 11/00* | (2006.01) |
| *H04W 4/08* | (2009.01) |
| H04L 29/08 | (2006.01) |
| H04H 20/71 | (2008.01) |
| H04H 20/76 | (2008.01) |
| H04W 4/80 | (2018.01) |

(56) References Cited

U.S. PATENT DOCUMENTS

| | | | |
|---|---|---|---|
| 2004/0139467 A1 | 7/2004 | Rogerson et al. | |
| 2005/0021602 A1* | 1/2005 | Noel | H04B 7/18506 709/203 |
| 2006/0048196 A1* | 3/2006 | Yau | H04N 21/2146 725/81 |
| 2007/0217622 A1* | 9/2007 | Takeuchi | H04W 16/18 381/86 |
| 2010/0162325 A1 | 6/2010 | Bonar | |
| 2011/0219407 A1 | 9/2011 | Margis et al. | |
| 2012/0167148 A1* | 6/2012 | Healy | H04N 21/2146 725/77 |
| 2014/0032660 A1* | 1/2014 | Nguyen | H04N 21/2146 709/204 |
| 2015/0382027 A1* | 12/2015 | Margis | H04N 21/632 715/716 |
| 2016/0248831 A1* | 8/2016 | Watson | G06F 16/44 |

* cited by examiner

DYNAMIC AND DISTRIBUTED MESHED NETWORK FOR IN-FLIGHT ENTERTAINMENT SYSTEMS

This application claims priority to U.S. provisional application Ser. No. 62/458,942 filed on Feb. 14, 2017. This and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

FIELD OF THE INVENTION

The field of the invention is system for the control of and distribution of content to airline in-flight entertainment systems.

BACKGROUND

The background description includes information that may be useful in understanding the present invention. It is not an admission that any of the information provided herein is prior art or relevant to the presently claimed invention, or that any publication specifically or implicitly referenced is prior art.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Current in-flight entertainment (IFE) systems are generally either fully wired, e.g. using Ethernet, or fully wireless, e.g. using Wi-Fi. An IFE is composed of servers, used for hosting data and controlling clients, and a number of individual passenger's screens (clients, which are generally mounted on the seats). Two IFE architectures are generally used: (1) distributed architecture, and (2) client centric architecture. Distributed architectures store most of or all of the content on server(s) and distribute the content to multiple, individual clients via streaming. Client centric architectures utilize the internal memory of the clients to store content locally (e.g. in client memory), which allows the clients to operate in an autonomous fashion, fore example playing content independently (to some extent) from the server(s). In both architectures the distribution of the content has to be performed by the server(s) to the clients either prior to flight and/or during the flight. The content is distributed using an IFE network in place in the aircraft.

Current fully wired (e.g. Ethernet) or fully wireless IFEs are limited necessarily by the capacity or performance of server resources that have to be shared by all clients that are being served at a given time (e.g. CPU, network, memory, mass storage, etc.). If there is one active server available the server has to serve hundreds of clients, which can lead to significant performance bottlenecks. One solution is to increase the number of servers so as to create sub-networks that have a relatively reduced number of clients sharing the server resources, thereby offering a higher achievable data rate per client. In fully wireless systems, however, at least several radio cells have to be deployed within the aircraft- primarily because a wireless LAN access point (WLAN AP) cannot serve a large number of active users at the same time. The medium has to be shared between the clients connected to the same WLAN AP. While a wired network inherently offers reliability it increases the number of cables and connectors, and therefore undesirably increases the weight of the aircraft. A wireless network, such as proposed in European Patent 1561308 (to Marston et al.), reduces the number of cables and connectors, transmission over a wireless medium is not as reliable as a wired network.

Systems that incorporate both wired and wireless communication have been proposed. For example, U.S. Pat. No. 8,565,758 (to Owyang et al.) describes a complex wireless data distribution architecture for use in an aircraft that incorporates a wireless distribution system that is in wired or wireless contact with an information network, however it provides little insight regarding how such a system can be physically implemented. U.S. Pat. No. 9,420,629 (to Krug) describes a system for providing broadband content within an aircraft by providing a central server that has a wired connection with a switch, where the switch can communicate with peripheral devices (which can be addressed as groups) via wireless protocols. Similarly, U.S. Patent Publication No. 2005/0021602 (to Noel et al.) describe a system in which a central server has wired connections to numerous wireless transmitters throughout the cabin of an aircraft, where each wireless transmitter provide information to wireless receivers associated with a group of seats. U.S. Patent Publication No. 2004/0139467 (to Rogerson and Mclelland) describes a media distribution system for use on an aircraft in which distribution units are provided that have an Ethernet connection with a media server or a web server, and have wireless connections to display units associated with seats of the aircraft. The display units can include processors and memory, and can interact with the wired distribution units to act as a distributed server, however it is unclear how information is distributed and exchanged within the described network.

Thus, there is still a need for a system that provides a sufficiently high rate of content transfer to support a large number of active passenger screens in an in-flight entertainment system without adding a burdensome amount of weight to the aircraft.

SUMMARY OF THE INVENTION

The inventive subject matter provides apparatus, systems and methods that provide an in-flight entertainment system in which both wireless and wired systems are mixed. Such an in-flight entertainment system can cope with specific airplane cabin environments, creating client group networks and inter-clients group networks using wired and/or wireless links. By avoiding the use of a fully wired network, such in-flight entertainment systems reduce the weight of the aircraft and facilitate maintenance. Such in-flight entertainment systems also provide a higher throughput per client that conventional systems, improving the speed at which data content is delivered.

Preferred systems and methods utilize a server and a plurality of in-flight entertainment units (also referred to herein as a "line replaceable unit" or "LRU") disposed with an aircraft. It should be noted that the description of the inventive subject matter contained herein references an aircraft. However, it is contemplated that the system and methods can be applied to other vehicles such as train cars, busses, or other multi-passenger vehicles or enclosed environments where wireless bandwidth is similarly limited.

Systems of the inventive concept include in-flight entertainment systems that include one or more server(s) hosting data and controlling the system, one or more wireless access points for distributing data wirelessly, and a plurality of clients (e.g. passengers' screens) equipped with internal memory and both Ethernet and wireless modules. The clients and the servers are interconnected using both wired and wireless networks. All clients are equipped with a wireless module such that they are coupled to and in communication with an access point. Clients are also interconnected to each other using wires (e.g. Ethernet and/or optical fiber) and/or wireless links (e.g. Wi-Fi or WiGig). Therefore, clients can communicate with the server(s) and also with each other.

Various objects, features, aspects and advantages of the inventive subject matter will become more apparent from the following detailed description of preferred embodiments, along with the accompanying drawing figures in which like numerals represent like components.

DETAILED DESCRIPTION

Throughout the following discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

It should be noted that any language directed to a computer should be read to include any suitable combination of computing devices, including servers, interfaces, systems, databases, agents, peers, engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Figure 1:
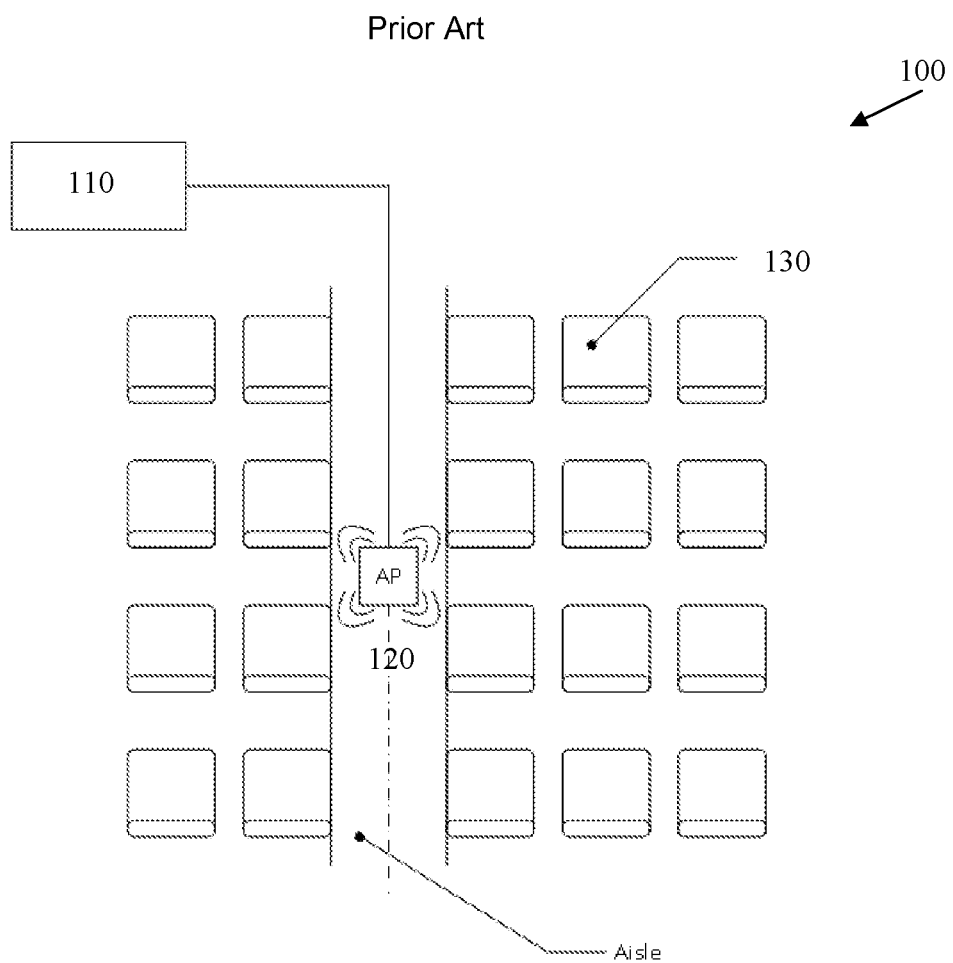
FIG. 1 illustrates an embodiment of a prior art wireless in-flight entertainment system.

FIG. 1 depicts an embodiment of a prior art wireless in-flight entertainment system 100. As shown, a server 110 is in wired communication with a wireless router (AP) 120 that transmits content wirelessly to individual clients (e.g. passenger screens) that are generally mounted on passenger seats 130.

Figure 2:
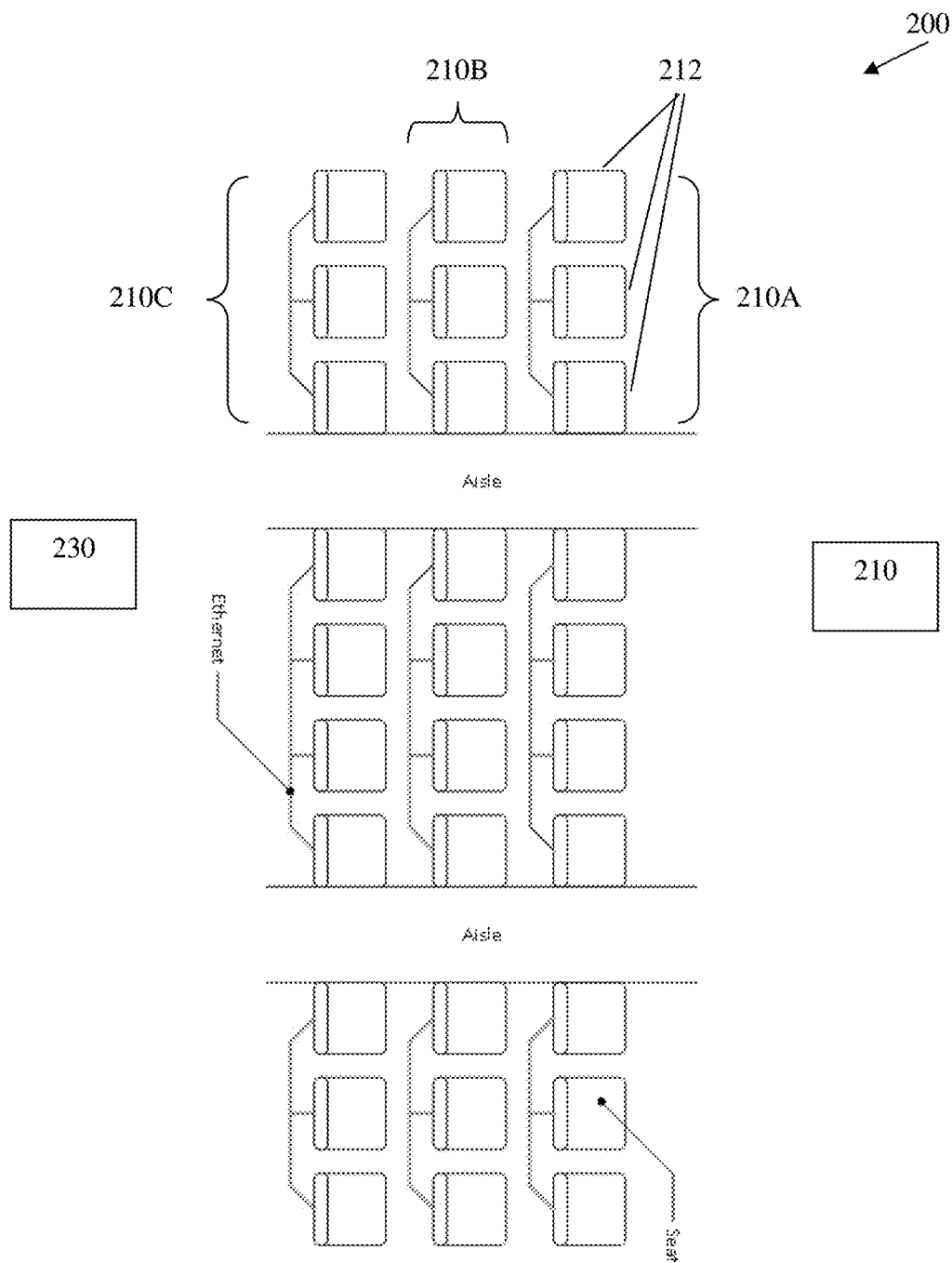
FIG. 2 illustrates one embodiment of a system where individual clients are connected to form a client group network.

FIG. 2 depicts one embodiment of a system 200 of the inventive concept in which groups of individual clients 212 (which include memory for content storage) are connected to form a number of client group networks. For example, as shown in the figure, there are nine distinct group networks. Groups 210A, 210B, and 210C each comprise three units disposed within individual rows of an aircraft or other vehicle. Although shown as disposed in seat rows, it is contemplated that a group network could comprise clusters of clients from two or more seat rows of an aircraft or other vehicle. For example, in another embodiment, group 210A could comprise all of the clients of groups 210A, 210B, and 210C.

Members of a client group network can be connected using a wired (e.g. Ethernet) connection or other commercially suitable connection that provides a high rate of data transfer with no appreciable interference.

As used herein, a client 212 generally refers to a unit of an in-flight entertainment system. In some embodiments, the unit may be line-replaceable, meaning it can quickly and easily be swapped out for maintenance or other purposes. In some embodiments, the unit or LRU can comprise a memory, a processor, a wireless interface (e.g., Wi-Fi, cellular, etc.), and display screen for video playback. Contemplated LRUs can include entertainment units integrated into aircraft seats, such as in the seat-backs (this includes both self-contained seatback LRUs having all of the components within the seatback unit and also modular LRU systems where the display screen is integrated into the seatback but other components such as the storage, communication interfaces and/or processor(s) are located under the seat or in a separate part of the seat), and overhead display units ("ODUs"). In embodiments, the LRU can also include a short-rage wireless data communication interface capable of short-range data exchanges. Examples of short-range wireless interfaces include near-field communication interfaces, Bluetooth, and IR (infra-red). In embodiments, the LRU can include a wired connection interface (e.g., USB, HDMI, Thunderbolt, etc.) that can be connected to other computing devices for data exchange and/or power supply.

As shown, such client group networks 210A, 210B, and 210C can be conveniently grouped by location within a particular row and relative to a particular aisle. In the example shown the client group networks reflect the 3-4-3 seating typical of many aircraft designs.

When system 200 is initially set up, or when the content has to be updated (e.g. monthly content updates), a server 220 has to distribute data to all clients. Clients (i.e. screens) can store data locally, which is useful for example for highly popular content. Data can thus be accessed locally, because it is already stored and therefore available, or accessed remotely when it is not stored and therefore needs to be downloaded from server. It should be appreciated that the way in which data is exchanged in the network improves the overall efficiency of data transfer and also the availability. Server 220 could be coupled via a wired or wireless connection to the client group networks 210A, 210B, 210C.

In an exemplary system, for installation ease of system 200, seats within the same row can be interconnected to each other, for example with an Ethernet switch. In an aircraft with a 3-4-3 seating organization, this means that each row could have three groups of seats that each act as a client group network: two columns of 3 seat client group networks and one column of 4 client group networks (see FIG. 2).

Initial content can be distributed within the system 200 from server 220, for example, as fast as possible to clients 212 using wireless access points 230, especially where nothing is stored locally. Once the initial content is transferred, the clients 212 can verify the content received. The clients 212 can, for example, interrogate neighboring clients that are connected in the same client group network for content, avoiding loading the access points 230 with unnecessary requests. For example, it is possible for one seat to have properly received initial content whereas a neighboring seat did not. This verification permits rapid and local resolution of this problem without the need to address the access points 230.

On-Demand Content Distribution: Upon the request of a passenger, if the content of interest is not stored locally at a client 212, the client 212 necessarily has to retrieve it. In some embodiments, it is contemplated that the client 212 may first interrogate other clients 212 located in the same client group network. Thus, for example, a client 212 could interrogate the other two of the clients within group network 210A. If another client has the content and is able to deliver it (e.g., not busy with other operations), the content is transferred between the two clients. As before, this allows avoiding loading access points 230.

If for some reason the wireless link between the client 212 and the access point 230 does not operate properly (e.g. obstruction of the signal), the client 212 can be configured to interrogate neighboring clients 212 to retrieve the content. As previously, it is up to the neighboring client 212 to decide whether or not it can deliver the content.

Since clients 212 preferably have local storage (although generally with a capacity smaller than server 220), content can be distributed in a specific fashion such that neighboring clients 212 can access more easily and with higher probability access the desired content.

For example, assume server 220 has a storage capacity of 4 Terabytes, and a client 212 has a storage capacity of 512 GBytes. Client 212 can thus store 12.5% of the available content (assuming server 220 is full of content). Among the 512 GBs, 256 GBs (50%) could be reserved for commonly requested content. The remaining 256 GBs can be used for distributed content. As a result clients would have 256 GBs of common content and (virtually) N times 256 GBs of distributed content, where N represents the number of clients connected to the client group network. For instance, in the 3-4-3 configuration shown in FIG. 2, clients between the window and the aisle (groups of 3 seats) would have a virtual storage of 1 Terabytes available. In this manner, each of the three clients of a group can have access to 25% of the total available content on the server 220 using their client group network and avoid requesting server resources needlessly.

Cooperative Networks: As noted above, within a aircraft there can be one or more client(s) 212 that are unable to communicate properly with a dedicated access point 230, for instance if the signal becomes obstructed (e.g. by passengers, crew, etc.). In such cases, a client 212 belonging to the same network group (e.g., 210A) can contribute and communicate with the access point 230 in order to retrieve the data requested by its neighbor client. This can be seen as a cooperative network in which nodes/clients 212 can assist each other. Logic functions within the neighboring clients can be used to determine whether or not this cooperation is possible and useful. For example, a neighboring client may be busy (for example, in receiving content for itself) to provide assistance.

Another advantage of the cooperative network resides in the channel diversity that exists between the access point 230 and the clients 212. In a client group network composed of N seats all antennas can be used for retrieving content, improving the probability of good reception and therefore increasing the overall reliability. As before, logic functions within the clients can be used to determine whether or not this cooperation is possible and useful. In such an embodiment the clients, at the completion of reception, can compare their content and contribute into rebuilding the original data, if necessary.

Figure 3:
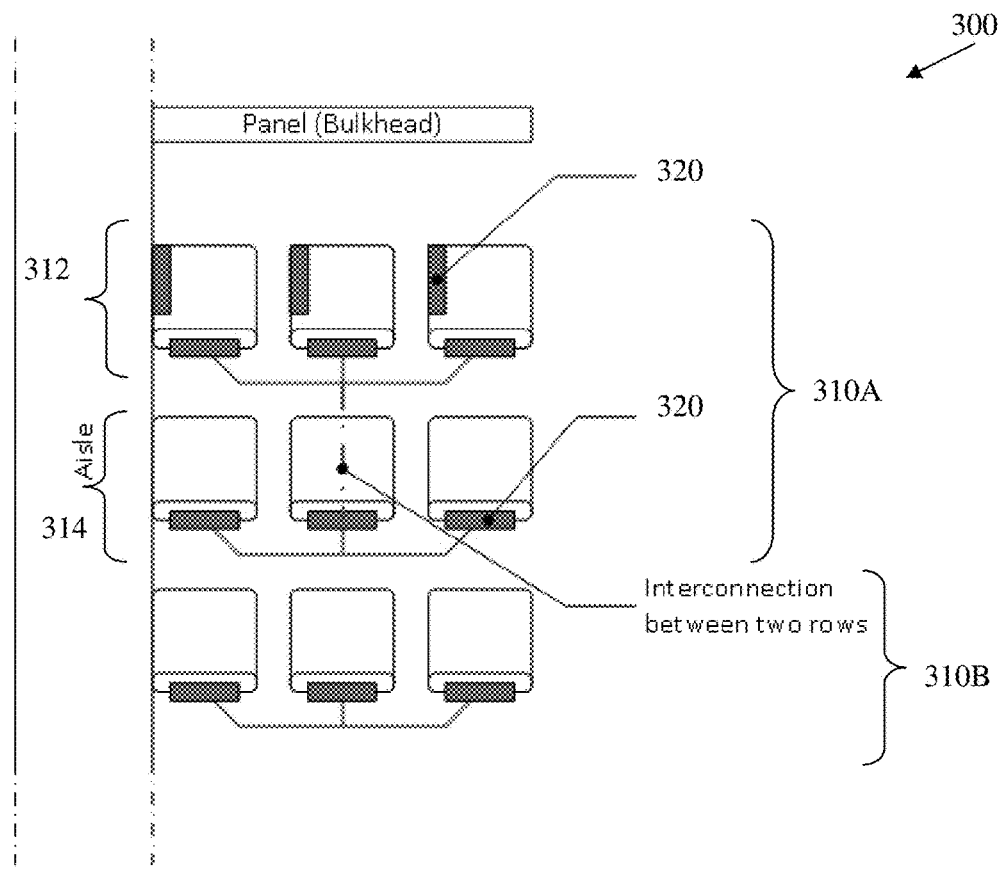
FIG. 3 illustrates another embodiment of a system where individual clients are connected to form a client group network.

In other embodiments, inter-row group networks can be formed by providing a wired (e.g. Ethernet) connection between different client group networks. One example of this configuration is shown in FIG. 3, which shows inter-row group network 310A formed by communicatively coupling between client group networks 312 and 314 associated with groups of seats in different seating rows of the aircraft. A separate group network 310B is also shown. Although shown as a wired connection, in some embodiments such an inter-client group network can be generated using a wireless connection between client group networks 312 and 314, for example.

Each the group networks 310A and 310B comprises a plurality of units 320 of an in-flight entertainment system 300, which may be located in an armrest or seat back, depending on the aircraft's configuration. It should be appreciated that in many aircraft, some seats may not have a screen (client) that is reachable by a wireless system and therefore be unable to receive content by such a route. Such seat screens are typically located in the armrest (for example, of the first seats after a panel, see FIG. 3), or seats located in areas without coverage (e.g. in a corner of a seating arrangement). Systems of the inventive concept also provide coverage of an entire flight cabin using a meshed network. This can be accomplished by providing inter-client group networks through interconnection between client group networks in different rows (see FIG. 3). The interconnection can be either wired (e.g. Ethernet) or wireless (e.g. Wi-Fi. It should be appreciated that, in the case of a wireless link, the connection can made when needed and the network can be seen as changing dynamically.

Figure 4:
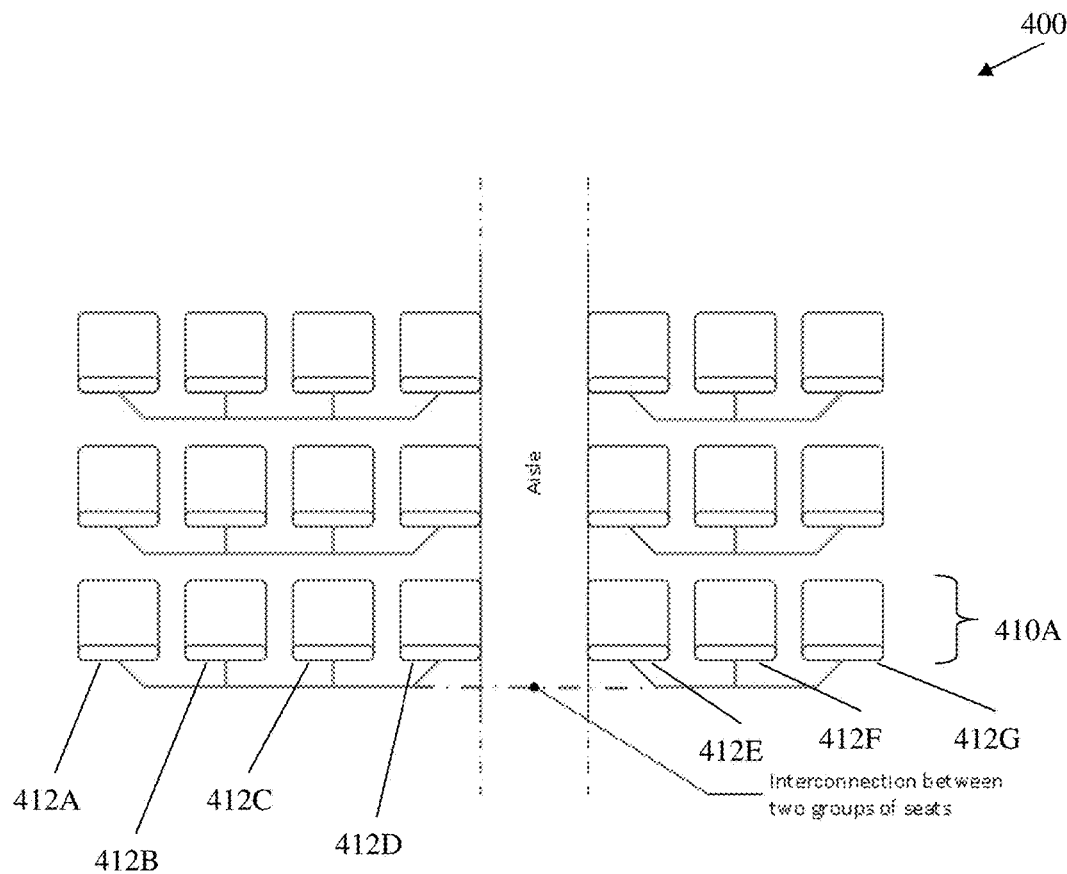
FIG. 4 illustrates yet another embodiment of a system where individual clients are connected to form a client group network.

Another example of an inter-client group network 410A of an in-flight entertainment system 400 is shown in FIG. 4, which depicts inter-client group networks formed by communicatively coupling between client group networks associated with groups of seats within the same seating row of the aircraft (for example, separated by an aisle or walkway). Although shown as a wired connection, in some embodiments such an inter-client group network can be generated using a wireless connection between client group networks. Thus, it is possible to enable communication between seats located on either side of an aisle. As before the communication can be done either using a wired connection or wirelessly. This permits a group of seats having poor conditions for wireless signal reception to be connected to another group of seats with good conditions.

For example, group network 410A can comprise units 412A-412G that are disposed within the same row, but are separated by an aisle. It should be appreciated that in-flight entertainment systems of the inventive concept can utilize a mixture of the architectures shown in FIG. 2, FIG. 3, and FIG. 4.

The use of inter-client group networks (e.g., 410A), which can be set dynamically, allows expansion of the number of clients 412A-412G belonging to a common information network. In the example shown in FIG. 4, and taking into account the storage capacities previously defined, a client group network of three seats is connected to another clients group network of 4 seats. In this case, each seat has a common content of 256 GBs and seven times 256 GBs of distributed content, leading to a virtual storage of 2 Terabytes. Dedicated algorithms can be put in place in order to distribute the content efficiently between the clients and avoid having duplicated content in seats, which may belong to the same network.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value with a range is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A system for distribution of content within a vehicle, comprising:
   a server comprising a first processor and a first memory, wherein the first memory comprises content for distribution within the vehicle;
   a distribution node that is communicatively coupled to the server; and
   a plurality of clients, wherein each of the plurality of clients comprises a client processor, a client memory, and a client transceiver, and wherein each of the plurality of clients is associated with a seat of the vehicle, and wherein a first client and a second client are communicatively coupled via a wired connection to form a first client group, and wherein the client memory is configured to store a set of commonly-requested content, and a set of distributed content, and wherein the set of commonly-requested content stored on each of the first and second clients of the first client group is the same portion of the content;
   wherein the first client group comprises N clients of the plurality of clients, and wherein each client memory of the clients of the first client group is configured to store at least 1/N of the content on the server, and wherein the client memories of the clients of the first client group store all of the content collectively across the clients of the first client group;
   wherein the distribution node is configured to transmit content to the client memories, and wherein the first client group is configured to permit exchange of content between the memories of the first and second clients, and wherein each of the first and second client are configured to interrogate over the wired connection the other client of the first client group for a specific content, and only interrogating the server for the specific content if the content is unavailable within the first client group.

2. The system of claim 1, further comprising a third client and a fourth client communicatively coupled to form a second client group, wherein the second client group is configured to permit exchange of content between the memories of the third and fourth clients.

3. The system of claim 2, wherein the first client group is communicatively coupled with the second client group to form an inter-client group network.

4. The system of claim 3, wherein the inter-client group network is configured to permit exchange of content between the first client group and the second client group.

5. The system of claim 3, wherein the first client group is associated with a first row of seats, and the second client group is associated with a second row of seats.

6. The system of claim 3, wherein the first inter-client group is communicatively coupled to the second inter-client group using a wired connection.

7. The system of claim 3, wherein the first inter-client group is communicatively coupled to the second inter-client group using a wireless connection.

8. The system of claim 1, wherein the server is communicatively coupled with the distribution node by a wired connection.

9. The system of claim 1, wherein the server is communicatively coupled with the distribution node by a wireless connection.

10. The system of claim 1, wherein the distribution node is communicatively coupled to at least one of the first and second clients of the first client group by a wireless connection.

11. The system of claim 1, wherein the distribution node is communicatively coupled to the plurality of clients by a mixture of wired and wireless connections.

12. A method of distributing content within a vehicle, comprising:
providing a server comprising a first processor and a first memory, wherein the first memory comprises content for distribution within the vehicle;
providing a distribution node that is communicatively coupled to the server;
providing a plurality of clients, wherein each of the plurality of clients comprises a client processor, a client memory, and a client transceiver, and wherein each of the plurality of client is associated with a seat of the vehicle, wherein a first client and a second client are communicatively coupled via a wired connection to form a first client group, wherein the distribution node is configured to transmit content to the client memories, and wherein the first client group is configured to permit exchange of content between the memories of the first and second clients;
wherein the client memory is configured to store a set of commonly-requested content, and a set of distributed content, and wherein the set of commonly-requested content stored on each of the first and second clients of the first client group is the same portion of the content;
wherein the first client group comprises N clients of the plurality of clients, and wherein each client memory of the clients of the first client group is configured to store at least 1/N of the content on the server, and wherein the client memories of the clients of the first client group store all of the content collectively across the clients of the first client group;
transmitting content from the server to the first client and the second client via the distribution node, wherein a first content is stored in the memory of the first client and a second content is stored in the memory of the second client; and
the first client interrogating the second client over the wired connection for the second content and only interrogating the server if the second content is unavailable from the second client;
transferring at least a portion of the first content from the first client to the memory of the second client.

13. The method of claim 12, further comprising providing a third client and a fourth client communicatively coupled to form a second client group, wherein the second client group is configured to permit exchange of content between the memories of the third and fourth clients.

14. The system of claim 13, wherein the first client group is communicatively coupled with the second client group to form an inter-client group network.

15. The method of claim 14, wherein the inter-client group network is configured to permit exchange of content between the first client group and the second client group.

16. The method of claim 14, wherein the third client receives a third content from the distribution node, and wherein at least a portion of the first content is transferred from the first client to the memory of the third client.

17. The method of claim 16, wherein the at least a portion of the first content is determined by a comparison between the first content and the third content.

18. The method of claim 12, wherein the at least a portion of the first content is determined by a comparison between the first content and the second content.

19. The method of claim 12, further comprising the first client interrogating the second client upon transfer of a set of content from a server to both the first and second clients to verify a proper receipt of the transferred set of content and generate a list of missing content, and the first client requesting or sending the missing content to or from the second client based on the list of missing content.

* * * * *